United States Patent
Kopf

(10) Patent No.: US 10,868,402 B2
(45) Date of Patent: Dec. 15, 2020

(54) PASSIVELY Q-SWITCHED SOLID-STATE LASER WITH COMPRESSED PULSE DURATION

(71) Applicant: MONTFORT Laser GmbH, Gotzis (AT)

(72) Inventor: Daniel Kopf, Rothis (AT)

(73) Assignee: MONTFORT Laser GmbH, Gotzis (AT)

(*) Notice: Subject to any disclaimer, the term of this patent is extended or adjusted under 35 U.S.C. 154(b) by 0 days.

(21) Appl. No.: 16/533,976

(22) Filed: Aug. 7, 2019

(65) Prior Publication Data
US 2020/0251875 A1 Aug. 6, 2020

(30) Foreign Application Priority Data
Jan. 31, 2019 (AT) .................................. A 38/2019

(51) Int. Cl.
*H01S 3/10* (2006.01)
*H01S 3/00* (2006.01)
(Continued)

(52) U.S. Cl.
CPC .......... *H01S 3/0057* (2013.01); *H01S 3/0627* (2013.01); *H01S 3/08013* (2013.01);
(Continued)

(58) Field of Classification Search
CPC .. H01S 3/118; H01S 3/08013; H01S 3/08054; H01S 3/094003; H01S 3/094038;
(Continued)

(56) References Cited

U.S. PATENT DOCUMENTS 5,701,319 A * 12/1997 Fermann ................ H01S 3/067
372/11
7,664,148 B2   2/2010 Sakai et al.
(Continued)

FOREIGN PATENT DOCUMENTS

CA    1164990    4/1984
CN    1645691    7/2005
(Continued)

OTHER PUBLICATIONS

Wang, Zeujun et al. "Single-longitudinal-mode Operation of 1 W combined actively and passively Q-switched Cr,Nd: YAGLaser", Optics Express, 6697 vol. 13, No. 18, pp. 6693-6698, https://doi.org/10.1364/OPEX.13.006693, Sep. 5, 2005.

(Continued)

*Primary Examiner* — Kinam Park
(74) *Attorney, Agent, or Firm* — Volpe Koenig

(57) ABSTRACT

A passively Q-switched solid-state laser includes a resonator (1) with an active laser material (2) and a decoupling end mirror (6) for decoupling laser pulses that have a pulse duration of less than 1 ns from the resonator (1), an optical fiber (13), into which the laser pulses decoupled from the decoupling end mirror (6) are injected, and a chirped volume Bragg grating (17), at which the laser pulses are reflected after they have passed through the optical fiber (13) for shortening the pulse duration. The pulse duration after the reflection on the chirped volume Bragg grating (17) is less than 30 ps. The active laser material (2) is Nd:YAG and a saturable absorber (3) that is formed from Cr:YAG and has a transmission in the unsaturated state of less than 50% is also arranged in the resonator. The length (a) of the resonator (1) is from 1 mm to 10 mm and the laser pulses decoupled at the decoupling end mirror (6) have a pulse energy from 1 μJ to 200 μJ.

10 Claims, 1 Drawing Sheet

(51) Int. Cl.
- H01S 3/11 (2006.01)
- H01S 3/16 (2006.01)
- H01S 3/094 (2006.01)
- H01S 3/08 (2006.01)
- H01S 3/0941 (2006.01)
- H01S 3/06 (2006.01)
- H01S 3/113 (2006.01)

(52) U.S. Cl.
CPC ...... H01S 3/08054 (2013.01); H01S 3/09415 (2013.01); H01S 3/094003 (2013.01); H01S 3/094038 (2013.01); H01S 3/10046 (2013.01); H01S 3/113 (2013.01); H01S 3/1118 (2013.01); H01S 3/1611 (2013.01); H01S 3/1643 (2013.01); H01S 3/08036 (2013.01); H01S 3/1115 (2013.01)

(58) Field of Classification Search
CPC .. H01S 3/09415; H01S 3/1611; H01S 3/1643; H01S 3/1115; H01S 3/08036; H01S 3/0627; H01S 3/10046; H01S 3/113; H01S 3/0057
See application file for complete search history.

(56) References Cited

U.S. PATENT DOCUMENTS

| | | | |
|---|---|---|---|
| 8,948,219 B2 | 2/2015 | Nodop et al. | |
| 9,124,064 B2 | 9/2015 | Kopf | |
| 2003/0021324 A1 | 1/2003 | Filgas | |
| 2005/0163170 A1* | 7/2005 | Okhotnikov | H01S 3/1022 372/6 |
| 2010/0296527 A1* | 11/2010 | Nicholson | H01S 3/1118 372/6 |
| 2010/0296529 A1* | 11/2010 | Andersen | H01S 3/1118 372/6 |
| 2012/0026504 A1* | 2/2012 | Yamada | G01B 9/02004 356/479 |
| 2013/0064262 A1* | 3/2013 | Kopf | H01S 3/0612 372/45.013 |
| 2015/0244141 A1* | 8/2015 | Kopf | H01S 3/0623 372/75 |
| 2017/0117681 A1* | 4/2017 | Kopf | H01S 3/1611 |
| 2017/0133815 A1* | 5/2017 | Kopf | H01S 3/1611 |
| 2018/0309261 A1 | 10/2018 | Taira et al. | |
| 2020/0194960 A1* | 6/2020 | Kopf | H01S 3/08031 |

FOREIGN PATENT DOCUMENTS

| | | |
|---|---|---|
| CN | 1328831 | 7/2007 |
| CN | 104158082 | 11/2014 |
| CN | 105390917 | 3/2016 |
| DE | 1645691 | 5/1970 |
| DE | 102010021262 | 10/2011 |
| WO | 2011147799 | 12/2011 |
| WO | 2014019003 | 2/2014 |
| WO | 2015021488 | 2/2015 |
| WO | 2015135011 | 9/2015 |
| WO | 2016004446 | 1/2016 |

OTHER PUBLICATIONS

Wang X et al, "Timing Jitter Reduction and Single-Frequency Operation in an Acousto-Optic Q-Switched CR, NS: YAG Laser", Applied Optics, Optical Society of America, Washington, DE, US, vol. 45, No. 33, pp. 8477-8483, Nov. 20, 2006.

Arvidsson, Magnus et al., "Combined actively and passively Q-switched microchip laser", SPIE—International Society for Optical Engineering, Proceedings, vol. 3265, p. 106, May 27, 1998.

Peng Zhu et al., "High Efficiency 165 W near-diffraction-limited N: YVO4 slab oscillator pumped at 880 nm", Optics Letters, Optical Society of America, US, vol. 33, No. 17, pp. 1930-1932, Sep. 1, 2008.

Omatsu T et al., "Passive Q-switching of a diode-side-pumped Nd doped 1.3@mm ceramic YAG bounce laser", Optics Communications, Elsevier, Amsterdam, NL, vol. 282, No. 24, pp. 4784-4788, Dec. 15, 2009.

Limpert, Jens et al., "High-pulse-energy passively Q-switched quasi-monolithic microchip lasers operating in the sub-100-ps pulse regime", Optical Letters, vol. 32, Nr. 15, pp. 2115-2117, downloaded Dec. 18, 2019, https://www.researchgate.net/Publication/6166856_High-pulse-energy_passively_Q-switched_quasi-monolithc_microchip_lasers_operating_in_the_sub-100-ps_pulse_regime>, Aug. 1, 2007.

Bhandari, Rakesh et al., "Palm-top size megawatt peak power ultraviolet microlaser", Optical Engineering, 7 pages, vol. 52(7), Jul. 2013.

Lee, Hee Chul et al., High-energy, sub-nanosecond linearly polarized passively Q-switched MOPA laser system, Optics and Laser Technology, pp. 81-85, 2017.

Mehner, E. et al., "Sub-20-ps pulses from a passively Q-switched microchip laser at 1 MHz repetition rate", Optics Letters, vol. 39, No. 10, pp. 2940-2943, May 15, 2014.

Turkyilmaz, Erdal et al., "Simple ps microchip Nd:YVO4 laser with 3.3-ps pulses at 0.2 to 1.4 MHz and single-stage amplification to the microjoule level", Optical Engineering, vol. 55(6), 066126-1 to -6, Jun. 2016.

Steinmetz, A. et al., Sub-5-ps, multimegawatt peak power pulses from a fiber-amplified and optically compressed passively Q-switched microchip laser, Optics Letters, vol. 37, No. 13, pp. 2550-2552, Jul. 1, 2012.

Lehneis, R. et al. "All-fiber pulse shortening of passively Q-switched microchip laser pulses down to sub-200 fs", Optics Letters, vol. 39, No. 20, pp. 5806-5809, Oct. 15, 2014.

Sakai, H et al., "1 MW peak power single-mode high-brightness passively A-switched Nd3+: YAG microchip laser", Optics Express, vol. 16, No. 24, pp. 19891-19899, Nov. 24, 2008.

Hayashi, Shin'ichiro et al., "Tunability enhancement of a terahertz-wave parametric generator pumped by a microchip Nd: YAG laser", Applied Optics, vol. 48, No. 15, pp. 2899-2902, May 20, 2008.

Braun, B et al., "56-ps passively Q-switched diode-pumped microchip laser", Optics Letters, vol. 22, No. 6, 3 pages, Mar. 15, 1997.

Stafsudd, O.M. et al., CO2 laser with simultaneous active and passive Q-switching, Applied Optics, vol. 10, No. 1, pp. 141-143, Jan. 1971.

RP Photonics Encyclopedia, Unstable Resonators, 4 pages, https://www.rp-photonics.com/unstable_resonators_html, Sep. 11, 2018.

RP Photonics Encyclopedia, Quasi-continuous-wave Operation, 2 pages, https://www.rp-photonics.com/quasi_continuous_wave_operation_html, Sep. 11, 2018.

RP Photonics Encyclopedia, Single-mode Operation, 2 pages, https://www.rp-photonics.com/single_mode_operation_html, Sep. 11, 2018.

Encyclopedia of Laser Physics and Technology—YAG lasers, "Other Laser-active Dopants in YAG", https://www.rp-photonics.com/yag_lasers.html, 2 pages, Aug. 29, 2018.

RP Photonics Encyclopedia, Alignment Sensitivity, 3 pages, https://www.rp-photonics.com/alignment_sensitivity_html, Aug. 29, 2018.

Druon, F, et al., "High-repetition-rate 300 ps pulsed ultraviolet source with a passively Q-switched microchip laser and a multipass amplifier", Optics Letters, Optical Society of America, U.S., vol. 24, No. 7, pp. 499-501, Apr. 1, 1999.

Mok, Joe, T., et al., "Soliton compression and pulse-train generation by use of a microchip Q-switched pulses in Bragg gratings", Optics Letters, vol. 30, No. 18, p. 2457, Sep. 15, 2005.

Kohl, Hagen et al., "12-ps megawatt peak power pulses out of a single laser oscillator with nonlinear pulse compression", SPIE—International Society for Optical Engineering, Proceedings, SPIE—International Society for Optical Engineering, U.S., vol. 10896, 8 pages, Mar. 7, 2019.

\* cited by examiner

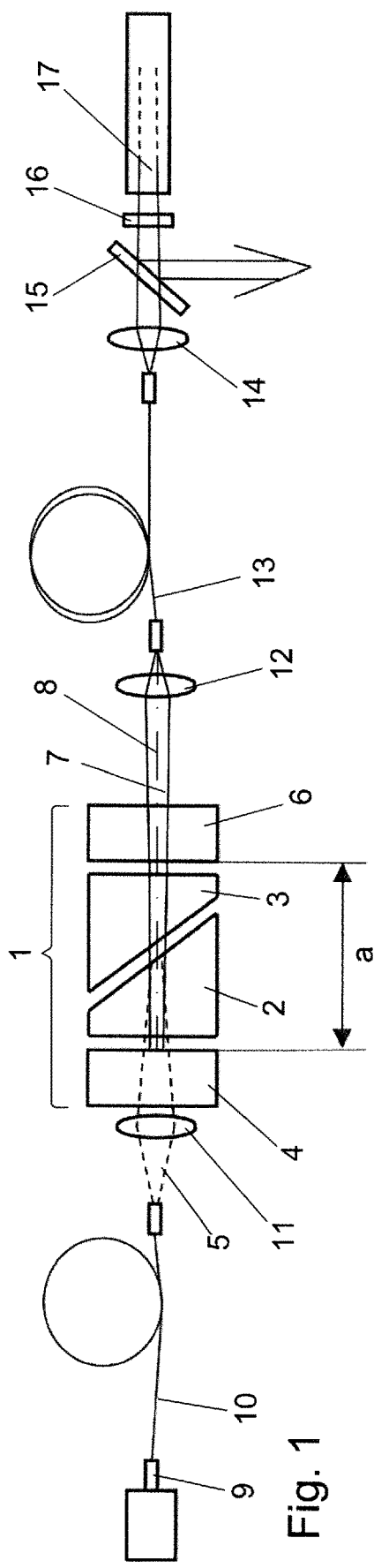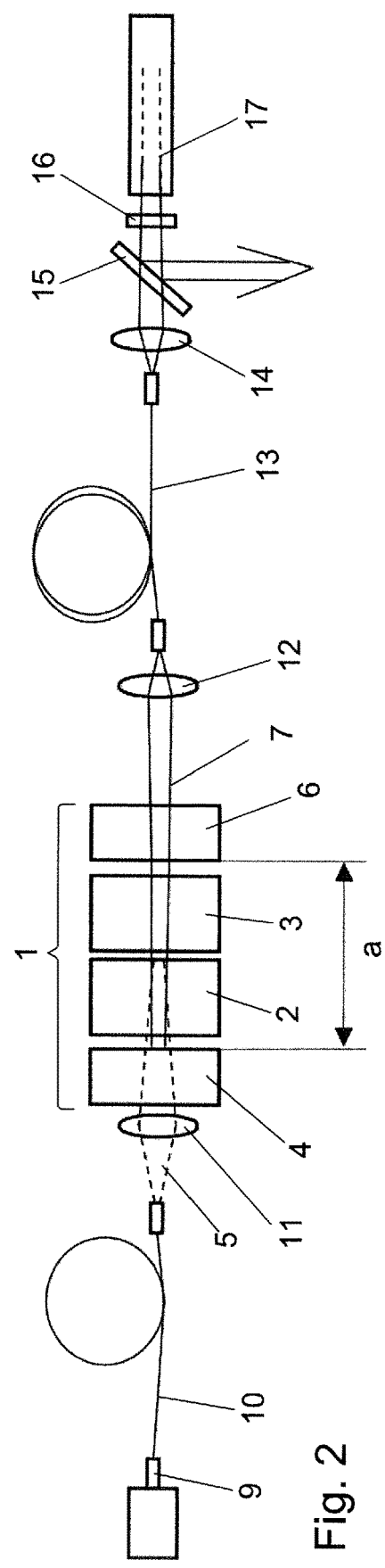

PASSIVELY Q-SWITCHED SOLID-STATE LASER WITH COMPRESSED PULSE DURATION

INCORPORATION BY REFERENCE

The following documents are incorporated herein by reference as if fully set forth: Austrian Patent Application No. A38/2019, filed Jan. 31, 2019.

TECHNICAL FIELD

The invention relates to a passively Q-switched solid-state laser that comprises a resonator, in which an active laser material is arranged and which has a decoupling end mirror for decoupling laser pulses that have a pulse duration of less than 1 ns from the resonator, an optical fiber, into which the laser pulses decoupled from the decoupling end mirror are injected, and a chirped volume Bragg grating, at which the laser pulses are reflected after they have passed through the optical fiber for shortening the pulse duration, wherein the pulse duration after the reflection on the chirped volume Bragg grating is less than 30 ps.

BACKGROUND

Passively Q-switched solid-state lasers are used in different fields of application. A UV laser that has, as a base, a passively Q-switched solid-state laser with a high pulse energy is disclosed, for example, from Bhandari R. and Taira T., "Palm-top size megawatt peak power ultraviolet microlaser," Optical Engineering, July 2013/Vol. 52(7), 076102-1-076102-6. To form a UV laser, the laser pulses decoupled from the resonator are wavelength-converted in a lithium-triborate crystal. Nd:YAG is used as the active laser material in the resonator and an absorber that is formed from a doped solid-state material in the form of Cr:YAG is used as the passive Q-switch. With a length of the resonator of 10 mm, a "free spectral range," that is, a distance between the wavelengths of possible adjacent longitudinal modes is achieved that is so large that only one of the longitudinal modes is close to the amplification maximum at 1064 nm so that this achieves oscillation build-up. With this laser, before the wavelength conversion, a high pulse energy of 3 mJ is achieved with a pulse duration of 230 ps and a relatively low repetition rate of 100 Hz. The design of the resonator is such that this is optically stable ("stable resonator"). The resonator can have a monolithic construction in the form of a microchip laser, wherein both end mirrors are planar and a thermal lens with focusing effect is formed in the operation of active laser material.

Passively Q-switched solid-state lasers with "single longitudinal mode" operation and, on the other hand, pulse energies that are smaller by several orders of magnitude in the range of a few 10 nJ are known in the form of very small monolithic microchip lasers with Nd:YVO4 as active laser material, e.g., WO 2016/004446 A1. The resonator lengths here can be less than 150 µm and a pulse duration of less than 100 ps can be achieved.

From Lee H. C. et al., "High energy, sub-nanosecond linearly polarized passively Q-switched MOPA laser system," Optics and Laser Technology 95 (2017) 81-85, a passively Q-switched Nd:YAG/Cr:YAG laser with stable resonator is disclosed, whose output pulses that have approx. 2.5 mJ pulse energy and are boosted to a pulse duration of approx. 550 ps. The active laser material and the absorber here have surfaces inversely arranged at the Brewster angle on their sides facing each other, in order to create a polarization selection of the laser beam.

A major field of application of laser radiation is the micro-material processing of metals and semiconductors. If the pulse duration is short relative to the thermal relaxation times, this leads to a material vaporization before the transfer to the phonon system of the grating, so that such material processing is also called "cold." The pulse duration of the laser pulses usually must be in the range from 1 ps to 20 ps. The pulse energy must reach the µJ range. The pulse repetition rates are typically between a few kHz and a few MHz and can be adjustable.

For certain medical applications, the required specifications can also lie in this range.

Known and commercially used lasers with these specifications are mode-coupled lasers, combined with regenerative amplifiers. A disadvantage in these systems is that they are relatively expensive and large.

Other development work has led to laser systems with different configurations, in which it has been shown that these specifications can be achieved. These systems, however, have previously not become well-established in industrial applications. One proposal consists in using a passively Q-switched microchip laser with a very short resonator as a base, in order to achieve short pulse durations of the emitted laser pulses that are further boosted to achieve a sufficient pulse energy. For passive Q-switching, semiconductor saturable mirrors (SESAM) can be used that barely prolong the length of the resonator. Here, pulse durations of up to less than 20 ps were achieved, see Mehner E. et al., "Sub-20-ps pulses from a passively Q-switched microchip laser at 1 MHz repetition rate," OPTICS LETTERS, Vol. 39, NO. 10, May 15, 2014, 2940-2943.

Reaching a pulse duration of less than 20 ps with the help of microchip lasers, however, is associated with difficulties and limitations. Therefore, for improvements, it was further suggested to compress the laser pulses output by the microchip laser before the amplification. From Turkyilmaz E. et al., "Simple ps microchip Nd:YVO4 laser with 3.3-ps pulses at 0.2 to 1.4 MHz and single-stage amplification to the microjoule level," Optical Engineering, June 2016/Vol. 55(6), 066126-1-066126-6, a laser of the type specified above is disclosed. It is based on a microchip laser that has Nd:YVO4 as the active laser material and a semiconductor saturable mirror for Q-switching. To compress the output pulses of the microchip laser, initially a spectral broadening is performed by guiding the laser pulses through an optical fiber with a length of 50 m. Then a reflection is realized on a chirped volume Bragg grating (CVBG), which causes the actual shortening of the pulse duration. The compressed pulses are then optically boosted, in order to obtain sufficient pulse energies.

SUMMARY

The object of the invention is to provide a passively Q-switched solid-state laser of the type specified above, which can be used advantageously in a very simple configuration for micromaterial processing. This is achieved with a laser having one or more features according to the invention.

The solid-state laser, whose output pulses are then compressed for shortening the pulse duration, has, according to the invention, Nd:YAG as the active laser material and Cr:YAG as the saturable absorber in the resonator with a transmission that is, in the unsaturated state, less than 50%, preferably less than 30%. The geometric resonator length is in the range from 1 mm to 10 mm, preferably 2 mm to 6 mm. The laser pulses that are decoupled at the decoupling end mirror and are then compressed have a pulse energy in the range from 1 µJ to 200 µJ, preferably 10 µJ to 100 µJ.

With the laser according to the invention, the pulse duration of pulses is compressed with such a high pulse energy that the laser pulses compressed in their pulse duration can be advantageously used directly for micromaterial processing, without any requirement of another amplification, whereby an especially simple and compact setup can be provided.

The pulse duration of the laser pulses decoupled at the decoupling end mirror is less than 1 ns, preferably less than 500 ps. These laser pulses are initially injected into an optical fiber, whose length is preferably in the range from 0.5 m to 5 m, advantageously in the range from 1 m to 3 m, for spectral broadening. The core diameter of the optical fiber is preferably greater than 10 µm and less than 30 µm. Preferably, the core diameter of the optical fiber is in the range from 15 µm to 20 µm. Such optical fibers are known as "large mode area" (LMA) fibers. These can be, in particular, polarization-maintaining fibers (PM fibers).

After passing through the optical fibers, the laser pulses are fed to a chirped volume Bragg grating (CVBG), at which the laser pulses are reflected, whereby the shortening of the pulse duration of the spectrally broadened laser pulses can be achieved. The pulse duration of the laser pulses at the outlet is less than 30 ps, preferably less than 20 ps. The pulse energy of the laser pulses at the outlet is preferably greater than 1 µJ. A pulse energy of greater than 10 µJ can also be advantageously possible.

When a pulse duration is mentioned in this text, this is measured as full duration at half maximum of the pulse (FDHM).

The resonator can have a monolithic construction. The laser unit, whose decoupled pulses are injected into the optical fiber, can be constructed as a microchip laser.

The pumping of the active laser material can be advantageously realized by one of the end mirrors of the resonator by a laser diode, in particular, continuously. The pump output is preferably in the range from 1-10 W. The pump beam is here preferably focused onto a diameter of less than 200 µm in the active laser material.

BRIEF DESCRIPTION OF THE DRAWINGS

Additional advantages and details of the invention will be explained below with reference to the accompanying drawing. Shown therein are:

FIG. 1 a schematic representation of a first embodiment of the invention, and

FIG. 2 a somewhat modified embodiment of the invention.

DETAILED DESCRIPTION

The laser has a resonator 1, in which Nd:YAG as active laser material 2 is arranged. Cr:YAG, more precisely $Cr^{4+}$:YAG, is arranged in the resonator 1 as saturable absorber.

The resonator 1 has an end mirror 4, through which the pump radiation 5 indicated by dashed lines is emitted. The end mirror 4 is highly reflective for the laser mode in the resonator 1, while it is highly transmissive for the pump radiation.

On the side opposite the end mirror 4, the resonator 1 has a decoupling end mirror 6. This is used to decouple the laser beam 7. The decoupling end mirror 6 is thus partially reflective for the laser mode in the resonator 1.

The resonator 1 is a linear resonator (=standing wave resonator). The length a of the resonator 1 (=geometric length or structural length from end mirror to end mirror) is in the range between 1 mm and 10 mm, preferably in the range between 2 mm and 6 mm.

The embodiment is an optically stable resonator, as this is preferred.

The resonator 1 is tuned by its length a so that a longitudinal mode of the laser radiation is right at the amplification maximum of the active laser material 2 of 1064 nm. Due to the shortness of the resonator 1, the "free spectral range" is so large that the adjacent longitudinal modes are so far outside of the amplification maximum that these essentially do not cause oscillation build-up (i.e., their energy is less than 10% of the dominant mode), in particular, do not cause oscillation build-up at all (i.e., the laser threshold is not exceeded). Thus, while operating, the laser has at least essentially only a single longitudinal mode. Advantageously, while operating, the laser also has at least essentially only a single transverse mode.

The saturable absorber 3 forms a passive Q-switch for the laser. The transmission of the saturable absorber 3 in its unsaturated state is less than 50%, preferably less than 30%, and can be in the range of 10%, for example.

Due to the shortness of the resonator 1 in connection with the high absorption of the saturable absorber 3 in the unsaturated state, laser pulses can be generated with a short pulse duration that is preferably less than 500 ps.

In the embodiment, the active laser material 2 and the absorber 3 are each cut and polished in a so-called "flat-Brewster" configuration. The active laser material 2 and the absorber 3 are each at the Brewster angle relative to the axis 8 of the laser beam 7 on their sides directed toward each other, wherein these sides are at least essentially parallel to each other and the opposite sides are at a right angle to the axis 8 of the laser beam. The flat side is preferably coated with an anti-reflection coating for the laser wavelength (optionally also for the wavelength of the pump radiation). The Brewster surfaces are not necessarily coated. The two Brewster surfaces let the p-polarization through unhindered, but produce losses for the s-polarization. In this way, the resonator is forced to run in the p-polarization, so that the s-polarization at least essentially does not cause oscillation build-up (i.e., the energy is less than 10%, preferably 1%, of that of the fundamental mode of the p-polarization), in particular, it does not cause oscillation build-up at all (i.e., the laser threshold is not exceeded).

To avoid an etalon effect for the s-polarization, which might reduce or switch off the losses for the s-polarization, the distance between the two Brewster surfaces must be selected exactly, so that there is not high transmission of the s-polarization for the wavelengths of any s-polarized modes that are close to the amplification maximum of the active laser material 2. Alternatively or additionally, a mutual slight tilting of the Brewster surfaces can also be provided.

The absorption can have a variable construction for such a "flat-Brewster" configuration of the absorber 3 through a displaceability of the absorber 3 at a right angle to the axis 8 of the laser beam 7.

On the other hand, the resonator 1 could also have a monolithic construction.

For pumping the laser, a laser diode 9 can be used. The pump power is preferably in the range of 1-10 W, for example, approximately 5 W. The pump radiation has, for example, a wavelength of 808 nm. The pump beam is focused onto a diameter of less than 200 µm in the active laser material in the embodiment.

Preferably, the pumping is continuous.

For example, the pump radiation output by the laser diode can be injected into a light guide 10. The emitted pump radiation output by the light guide 10 is collimated by a lens 11 and irradiated by the end mirror 4 into the active laser material 2.

The laser beam 7 formed by laser pulses and decoupled at the decoupling end mirror 6 is injected by at least one lens 12 into an optical fiber 13, in particular, glass fiber. Due to the high intensity of the laser radiation in the optical fiber 13, the wavelength spectrum of each laser pulses is broadened by self phase modulation (SPM), which results in spatial spreading of the various spectral components. The length of the optical fiber 13 is preferably in the range from 0.5 m to 5 m, advantageously in the range from 1 m to 3 m, for example, 2 m. In particular, it is a "large mode area" fiber (LMA fiber). The core diameter can be, for example, in the range from 15 µm to 20 µm.

Ideally, the fundamental mode of the fiber is excited.

For avoiding back reflection, the entry facet of the optical fiber 13 is preferably cleaved so that it is at an angle to the orientation perpendicular to the axis of the laser beam, for example, at an angle of 8°.

The laser beam decoupled from the fiber is collimated by at least one lens 14 and is reflected at a chirped volume Bragg grating 17 after passing through a polarizer 15 and a λ/4 plate 16, wherein the pulse duration of each laser pulse is shortened. The reflected laser beam passes, in turn, through the λ/4 plate 16 and is then reflected at the polarizer 15, because the polarization direction is rotated by 90° relative to the first passage through the polarizer 15.

The pulses of the emerging laser beam have a pulse duration that is less than 30 ps, preferably less than 20 ps. The pulse energies of the emerging pulses are preferably greater than 1 µJ. A downstream amplification, in order to use the emerging laser beam for micromaterial processing, thus can be eliminated.

The pulse repetition rate is preferable in the range from 1 kHz to 100 kHz.

In the embodiment, the laser beam is incident on the chirped volume Bragg grating 17 at a right angle, thus the incident angle and the emergent angle is 0°. Incidence at an angle not equal to 0° would also be possible. The reflected laser beam would then be separated locally by the reflection of the incident laser beam. The polarizer 15 and the λ/4 plate 16 could also be eliminated in such a construction.

A second, somewhat modified embodiment is shown in FIG. 2. The difference with the first embodiment consists in that, here, the Brewster angle is not applicable at the active laser material 2 and at the saturable absorber 3. A selection of the desired polarization of the laser beam could then be performed in a different way. For this purpose, e.g., an element of the resonator could have a grating structure, whose transmission differs for different polarization directions. For example, one of the end mirrors 4, 6 could be provided with a coating having such a grating structure. Through an appropriate selection of the orientation of the crystals of the active laser material 2 and the saturable absorber 3 and/or through selected application of a mechanical pressure on the active laser material 2 and/or the saturable absorber 3, such a polarization selection can also be achieved. It would also be conceivable and possible to eliminate such a polarization selection. The decoupling of the laser beam after the reflection on the chirped volume Bragg grating 17 could then be realized in a different way by a polarizer, for example, by an incidence of the laser beam on the chirped volume Bragg grating 17 at an angle not equal to 0°.

LEGEND TO THE REFERENCE SYMBOLS

1 Resonator
2 Active laser material
3 Saturable absorber
4 End mirror
5 Pump radiation
6 Decoupling end mirror
7 Laser beam
8 Axis
9 Laser diode
10 Light guide
11 Lens
12 Lens
13 Optical fiber
14 Lens
15 Polarizer
16 λ/4 plate
17 Chirped volume Bragg grating

The invention claimed is:

1. A passively Q-switched solid-state laser, comprising
a resonator including an active laser material and a decoupling end mirror configured to decouple laser pulses that have a pulse duration of less than 1 ns from the resonator,
an optical fiber configured to receive the laser pulses decoupled from the decoupling end mirror,
a chirped volume Bragg grating configured to reflect the laser pulses after they have passed through the optical fiber for shortening the pulse duration such that the pulse duration after reflection on the chirped volume Bragg grating is less than 30 ps,
the active laser material arranged in the resonator is Nd:YAG and a saturable absorber that is formed from Cr:YAG and has a transmission in the unsaturated state of less than 50% is also arranged in the resonator, and
a length of the resonator is from 1 mm to 10 mm and the laser pulses decoupled at the decoupling end mirror of the resonator have a pulse energy from 1 µJ to 200 µJ.

2. The solid-state laser according to claim 1, wherein the optical fiber has a core diameter of greater than 10 µm.

3. The solid-state laser according to claim 2, wherein the optical fiber is a polarization-maintaining fiber.

4. The solid-state laser according to claim 1, wherein a length of the optical fiber is from 0.5 m to 5 m.

5. The solid-state laser according to claim 1, wherein sides of the active laser material and the saturable absorber directed toward each other are at a Brewster angle relative to an axis of the laser beam, and are inclined in a same direction relative to an orientation at a right angle to the axis of the laser beam.

6. The solid-state laser according to claim 1, wherein an incident angle and emergent angle of the laser beam at the chirped volume Bragg grating is 0°.

7. The solid-state laser according to claim 6, further comprising λ/4 plate and a polarizer, and a decoupling of the laser pulses after the reflection on the chirped volume Bragg grating is realized by the polarizer, and the λ/4 plate is arranged between the chirped volume Bragg grating and the polarizer.

8. The solid-state laser according to claim 1, further comprising a laser diode configured for pumping of the active laser material through an end mirror of the resonator opposite the decoupling end mirror.

9. The solid-state laser according to claim 8, wherein the pumping of the active laser material is continuous.

10. The solid-state laser according to claim 1, wherein an oscillation build-up of at least essentially only a single longitudinal mode is realized in the resonator.

* * * * *